Oct. 13, 1953          F. NETTEL          2,654,991
CONTROL FOR ENGINE TURBOSUPERCHARGER SYSTEMS
Filed Sept. 9, 1950
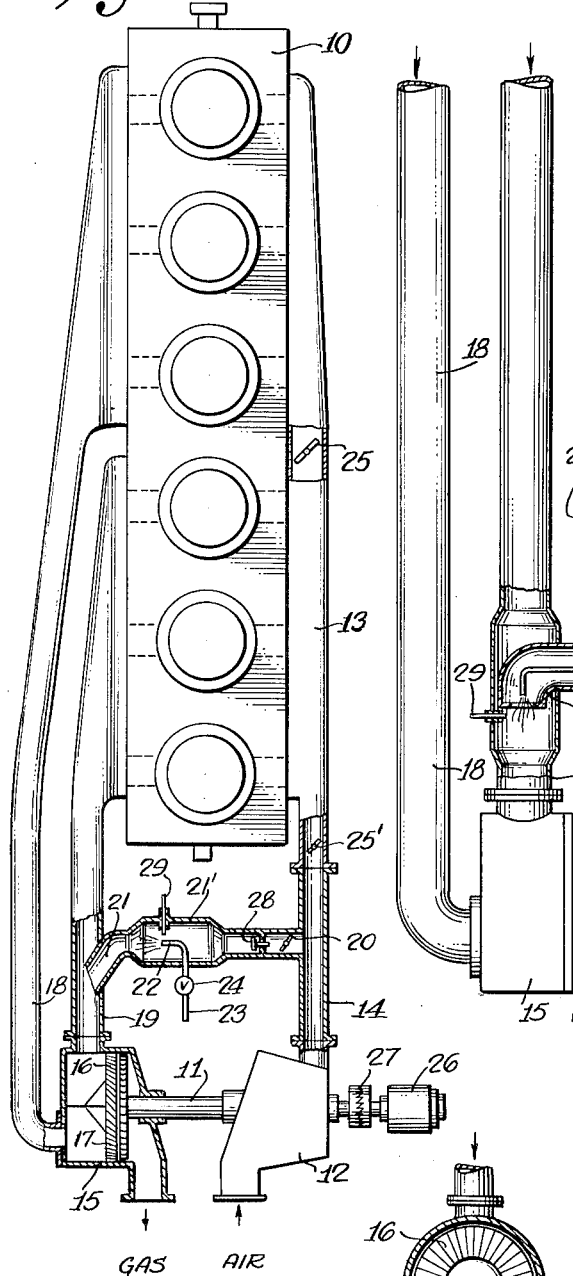
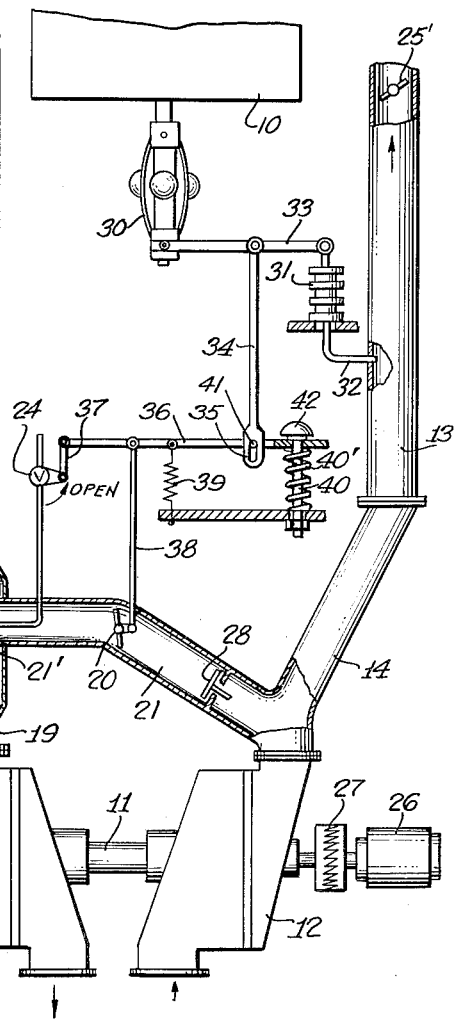
Inventor,
FREDERICK NETTEL.
Bertram Ottinger
By. Attorney.

Patented Oct. 13, 1953

2,654,991

UNITED STATES PATENT OFFICE 2,654,991

CONTROL FOR ENGINE TURBOSUPER-
CHARGER SYSTEMS

Frederick Nettel, Manhasset, N. Y.

Application September 9, 1950, Serial No. 183,925

1 Claim. (Cl. 60—13)

This invention relates to improvements in turbocharged multiple cylinder internal combustion engines with a turbocharger set consisting of a rotary blower driven by an exhaust gas-driven turbine which is mechanically independent of the engine shaft.

Such engines, in service, particularly for automotive drive and certain marine drives, are subjected to suddenly applied loads while the engine is operating at reduced speeds. At partial speeds and/or loads the amount of exhaust gases as well as the energy available in them for driving the exhaust gas turbine means and the blower means is much smaller than at full load and full speed of the engine. Since the exhaust gas turbine as well as the blower must be designed for the requirements of full load, the turbine in particular has too large a nozzle area for partial loads and consequently the speed of the turbocharger set drops too fast with the load and/or speed making it impossible for the engine to furnish full torque at low speeds, especially when this torque is suddenly required.

Conventionally supercharged compression-ignition engines, when designed to operate at high supercharge, operate with increased clearance space, i. e. reduced built-in volumetric compression ratio, which makes them bad starters when cold.

It has been proposed to improve the performance of such engines by providing a plurality of turbocharger sets and to switch off one or more of these sets at partial loads and/or speeds. This is uneconomical especially for medium and small size engines.

It is an object of this invention to provide means whereby the speed of the turbocharging means can be regulated independently of the working condition of the engine, thus enabling the engine to give high torque at low speeds.

It is another object of this invention to use the same means which are used for regulating the speed and consequently the pressure of the blower means for operating the turbocharger set as independent gas turbine means for supplying compressed and preheated air with the engine at standstill and during cranking.

The invention is particularly intended and applicable to turbocharged multiple cylinder engines working with two or more exhaust pipes each of which connects a group of two or more cylinder outlets to a separate group of turbine nozzles. This, as known in the art, was done so far to prevent interference with the scavenging of one cylinder by the exhaust impulses of another cylinder, especially where the charging and exhaust valves to the cylinders are timed so as to be both maintained open towards the end of the exhaust periods to improve scavenging of the cylinders. Under such condition the exhaust gas turbine operates as so-called blow-down turbine, with the pressure in front of the two or more separate turbine inlet nozzle groups dropping periodically to values substantially lower than the charging air pressure supplied by the blower means.

In conventional turbocharged engines of the type mentioned above, for example a six-cylinder engine with two exhaust pipes connecting three cylinders each to each of the two separate nozzle chests of the turbine means, each of the nozzle chests has to carry all of the engine exhaust gases for half the time. This determines the area of the two nozzle chests, but they would be too large if both were connected simultaneously to the blower, to enable the turbocharger to work as an independent gas turbine plant with an auxiliary combustion chamber provided in the conduit between these two nozzle chests and the blower outlet. I have experimentally determined that such operation is not feasible at practically permissible gas temperatures in front of the turbine nozzles, but have ascertained that the area of one of the two nozzle chests alone, designed for conventional supercharge operation with the turbine acting as blow-down turbine, is much better suited to match the blower output. I have found it possible to operate the turbocharger set independently of the engine with the help of an auxiliary combustion chamber disposed in a bypass conduit between the blower outlet and a part of the exhaust pipes from the engine to the turbine inlet. While the turbine efficiency is somewhat lower in this case, due to the gas admission angle being reduced, for example from 360 degrees to 180 degrees, the temperature in front of the turbine needed to keep the set operating as independent gas turbine plant can be maintained within practically permissible values.

Thus, according to the present invention, only a part of the exhaust pipes leading to separate turbine nozzle groups are connected by bypass conduit means to the blower outlet pipe, with auxiliary fuel burning combustion chamber means disposed in this latter conduit means. The simplest form of the present invention is to use it for four to six cylinder engines with two separate nozzle chests, one of which may receive gases either from the engine only, or from the combustion chamber only, or simultaneously from both sources, as the operating conditions of the engine require.

In order to control the flow of gases from the combustion chamber to one or more of the nozzle chests of the turbine, suitable control means for the air bypassed to the combustion chamber and for the fuel burned in the latter may be provided according to this invention.

Other objects and advantages of the invention will become apparent from the inspection of the accompanying drawing and description thereof which follows.

In the drawing:

Fig. 1 indicates diagrammatically the basic arrangement of a six-cylinder compression-ignition engine with a turbocharger set and auxiliary combustion chamber provided in accordance with the present invention;

Fig. 2 is a section through the gas turbine showing the sub-division of its nozzle chest in two parts; and Fig. 3 illustrates an example of automatic control of the auxiliary combustion chamber in accordance with changing operating conditions of the turbocharged engine.

In the power plant illustrated in Fig. 1 the reference numeral 10 indicates an engine which, for the purposes of this description, may be assumed to be a six-cylinder four-stroke diesel engine. A turbocharger set 11 is provided consisting of a blower 12 connected to the engine intake manifold 13 by a conduit 14 and an exhaust gas turbine 15 with two intake nozzle chests 16 and 17, which latter are each connected to the outlets of a group of three cylinders by conduits 18 and 19, respectively. The conduit 14 is further connected via flow control means 20 to the conduit 19 by a bypass conduit 21, within which is disposed an auxiliary combustion chamber 21', known per se, having a fuel nozzle 22, a fuel pipe 23 and a fuel control valve 24. This fuel pipe is supplied with fuel oil under pressure from a source (not shown). A flap valve 25 is so disposed inside the air intake manifold 13, that by closing it, the air flow from the blower 12 to the upper three cylinders is blocked. Alternatively, a flap valve 25' is indicated at the inlet to the air intake manifold 13 which by closing it permits to blow the air flow to all engine cylinders. Twenty-eight (28) is a non-return valve, 29 an ignition device for the flame.

With the control means 20 blocking the flow through conduit 21, the arrangement can operate as a conventional turbocharged engine with the turbine working as blow-down turbine. If now at partial load a higher supercharge is desired, to take care of a sudden demand for higher load, or at low speed fast acceleration under increasing load is demanded, the control means 20 and 24 are opened to a suitable degree and fuel is ignited by a device 29 and burned in the thus bypassed air in chamber 21'. The hot gases thus produced flow into conduit 19 where they mix with the exhaust gases from the lower group of three cylinders and thereafter via nozzle chest 16 to the turbine. While this happens, the part of the turbine 15 fed by nozzle chest 16 ceases to operate as pure blow-down turbine and operate partly also on the gases from chamber 21'. Since the mixture of these gases with the exhaust gases is now hotter than the exhaust gases by themselves and, besides, the gas flow through chest 16 is now increased, the speed of the turbocharger set rises and consequently also the supercharge which enables the engine to deal with a larger torque without smoke formation. Since for a larger engine output more fuel has to be fed to the engine, the exhaust gas temperature rises, thereby increasing the turbine output which is necessary to maintain the turbocharger at its higher speed. The drive assist furnished by the gases from chamber 21' can be reduced by gradual closing of the valve 20 and reducing the fuel fed to chamber 21' by valve 24, until with increasing engine speed it can be stopped altogether, when the whole turbine returns to blow-down operation. From the above it is thus clear that for purposes of picking up load the utilization of the chamber 21' may be only of a transient nature, which is important from an economical standpoint, since the fuel burned in chamber 21' must be debited to the engine.

Particularly at low engine speeds, the gas pressure pulses coming from the lower three cylinders may cause the gas flow in the bypass pipe 21 to reverse itself periodically. To prevent that, a non-return valve 28 or other known one-way flow device may be provided. In order to avoid prolonged interruption in the operation of the combustion chamber, the ignition device is preferably kept working continuously under these conditions.

Fig. 2 shows more clearly how the nozzles of the turbine 15 are subdivided into an upper nozzle chest 16 fed by pipe 19 and a lower nozzle chest 17 fed by pipe 18.

In many applications the engine works for most of the time at loads in the range of 60 to 80 percent of the maximum output of the engine and at speeds around 70 to 80 percent of the maximum engine speed. In this range the greatest economy is desired and thus pure blow-down turbocharging is indicated. For maximum outputs, especially at very high speeds, experience shows that blow-down turbocharging does not furnish a sufficiently large quantity of scavenging air for the cylinders, which leads to overheating of the engine.

This invention aims to avoid this drawback by bringing the combustion chamber into operation near the maximum speed and load range of the engine. While the fuel economy of the plant as a whole around maximum load will be lower as compared with pure blow-down operation, this is of minor importance because of the comparatively short periods during which maximum performance is needed in many cases, the advantage is in the possibility of obtaining a higher maximum output without overheating the engine.

If we assume an engine designed for a supercharge pressure ratio of say 2:1, the built-in volumetric compression ratio of the engine has to be reduced, say to 11:1 or even lower, in order to limit the highest cylinder pressures at full load. Such an engine would start badly with the conventional turbocharger set at standstill, or not at all in case of a diesel type engine when the temperature of the ambient air drops to around 32 deg. F. or lower. In order to ensure a satisfactory start of such an engine, the turbocharger is started ahead of cranking of the engine in the following manner:

Flap valve 25, disposed in the air intake manifold 13, is closed, thereby blocking the air flow from the blower to the upper group of three cylinders, which discharge into exhaust pipe 18. Valve 20 is fully opened. A starting motor 26 is energized to initiate rotation of the turbocharger set via an overrunning clutch 27. Air begins to be blown by blower 12 via conduit 14, conduit 21, chamber 21', conduit 19, nozzle chest 16 and through the turbine 15 back to the ambient air. Fuel then is fed to the combustion chamber by operating valve 24 and is ignited. The hot gases reaching the turbine begin to drive it and the set 11 runs by itself, so that the motor 26 can be deenergized and uncoupled. By increasing the fuel fed to chamber 21', the speed of the set 11 can be brought to any desired value, and consequently also the air pressure at manifold 13 can be adjusted at will. If the engine now is cranked, it fires immediately on all cylinders if, simultaneously with feeding fuel to them, the flap 25 is opened. After starting the engine, the valve 20 can be gradually closed and the fuel supply to chamber 21' reduced and, with increasing load, valve 20 and fuel valve 24 shut altogether, after which both nozzle chests 16 and 17 supply gases to the turbine 15 which operates now as pure blow-down turbine. The chamber 21' remains ready to furnish power assist to the turbine 15 at any moment, which is of great practical importance for certain applications.

Instead of valve 25 the valve 25' may be used which is closed during starting of the turbocharger set and prevents air flow to all cylinders.

It is within the scope of this invention to automatically regulate the operation of the auxiliary combustion chamber in accordance with changing working conditions of the engine.

An example of such operation is illustrated in Fig. 3 which shows only the lower end of the engine 10, the conduit 14 for the charging air, and the two exhaust conduits 18 and 19. All parts denoting the same or equivalent parts shown in Fig. 1 are described by the same reference numerals as in Fig. 1. A flyball governor 30 driven from the engine shaft and an elastic bellows 31 connected by a tube 32 to the conduit 14 support opposite ends of a lever 33. An intermediate point of said lever is hingedly connected to a rod 34 whose lower end is provided with a slot 35. Another horizontal lever 36 is connected by a rod 37 to the fuel valve 24 and by a rod 38 to the flap valve 20. A tension spring 39 between the slot 35 and rod urges the lever 36 downwardly. A spring supported bolt 40 with push button 42 is connected to the lever 36 on the opposite side of slot 35. A pin 41 fixed to lever 36 engages with the slot 35 of rod 34.

Under normal loads and speeds of the engine the position of the governor 30 and the bellows 31 determine the position of the rod 34 in such manner that the slot 35 is not lifted high enough to act on pin 41. The rod 36 is pulled downwards at its left hand end by spring 39 until both the flap valve 20 and fuel valve 24 are completely closed, the fulcrum being formed by the bolt support 40. In this condition the engine operates as conventionally supercharged engine with the turbine acting as blown-down turbine.

If, however, the engine speed and the charging pressure in conduit 14 both exceed predetermined values which indicate a load condition in excess of what the engine thus supercharged will stand thermally, lever 33 will be lifted sufficiently to cause the pin 41 to lift the rod 36 around the fulcrum at 40, thereby opening both the flap valve 20 and fuel valve 24. With the ignition device 29 operating, a flame will start in chamber 21' in the air stream flowing from conduit 14 via the non-return valve 28 which will open as soon as the pressure in exhaust pipe 19 falls under that prevailing in conduit 14. The thus initiated increase in gas flow to the turbine causes the speed of the turbocharger set 11 to rise, thereby increasing the air flow to the engine cylinders which thus are enabled to deal with the higher load without overheating.

While the pressure pulsations in conduit 19 may cause momentary interruptions in flow through the combustion chamber 21', this does not prevent an effective power assist to the turbine from being achieved, backflow from conduit 19 to conduit 14 being prevented by the non-return valve 28.

If while fuel is burning in chamber 21' the load on the engine is decreased, the decreasing pressure in bellows 31 will cause it to pull rod 33 down, which action will be intensified if the engine speed drops too, causing the rod 34 to move downward and permitting the spring 39 to actuate both the flap valve 20 and fuel valve 24 to partially or completely close the same according to the degree of movement. The engine returns to the conventional supercharging operation.

If at low load and/or speed a sudden acceleration of the engine is desired, for which a higher supercharge is desirable, push button 42 is pressed down against the action of its compression spring 40' until the pin 41 rests on the lower end of the slot 35. If button 42 is pressed down further, the lever 36 moves around pin 41 as fulcrum, lifting its left hand end, and thereby brings the flap 20 and valve 24 into operation. The turbocharger set speed rises as long as button 42 is pressed down and enables the engine to take more load without smoking.

The same push button 42 can be used for starting the turbocharged set, after the set has been accelerated to a suitable speed by the auxiliary motor 26, by pressing it down all the way, thereby opening flap 20 fully and feeding enough fuel by the also opened valve 24. After cranking the engine and after it has fired, push button 42 can be released, thereby putting the auxiliary chamber 21' out of operation, whereupon the engine will continue operating as conventionally turbocharged engine. As mentioned before, during starting of the turbocharger set the valve 25 shown in Fig. 1 has to block the air flow to the upper group of the cylinders, i. e. those cylinders which do not discharge through exhaust pipe 19 to nozzle chest 16.

In Fig. 3 the valve 25' blocks the flow of the air from the blower to all engine cylinders while operating the turbocharger set by means of the auxiliary combustion chamber as power self supporting gas turbine unit.

It is immaterial for the purposes of this invention what number, one or more, and what particular type of gas turbine means is used, axial, radial or mixed flow of one or more stages, it being only essential that its nozzle chest is sub-divided, each sub-division being connected to a group of engine cylinder outlets by conduits some, but not all of which, are disposed to receive also combustion gases from a fuel burning combustion chamber.

It is also immaterial for this invention what type of engine is supercharged, four-stroke cycle or two-stroke cycle, and what particular cylinder arrangement is chosen.

All the embodiments of this invention herein illustrated are shown merely by way of non-limiting examples, and thus the invention may be carried out by any other suitable means or devices.

What I claim is:

In a turbocharging system for internal combustion engines, including an internal combustion engine having a plurality of cylinders divided into groups, inlet and exhaust means in said cylinders, exhaust turbine means, compressor means, means to drivingly connect said turbine means to said compressor means, said turbine means and said compressor means being mechanically independent of the said engine, first conduit means to convey the compressed air from said compressor means to said engine, said gas turbine means being provided with a plurality of separate gas inlet chests, and a plurality of second separate conduit means for connecting the exhaust means of every group of two or more cylinders with one of said separate gas inlet chests of said turbine means, valve controlled third conduit means with interposed fuel burning combustion chamber means for connecting said first conduit means with some only, of said second separate conduit means, so that according to changing operating conditions of the engine some only of the separate gas inlet chests of said turbine means may be supplied with gases either from the said combustion chamber means through the third conduit means alone, or from the said second conduit means alone, or simultaneously from both said third and second conduit means, means for operating the turbine means and compressor means as an independent gas turbine unit by supplying said gas turbine with gases exclusively through the third conduit means, and valve means to block the flow of air from the blower to at least some engine cylinders during such independent operation of the said gas turbine and compressor.

FREDERICK NETTEL.

References Cited in the file of this patent

UNITED STATES PATENTS

| Number | Name | Date |
|---|---|---|
| 1,921,906 | Buchi | Aug. 8, 1933 |
| 2,375,006 | Larrecq | May 1, 1945 |
| 2,379,455 | Prince | July 3, 1945 |
| 2,503,289 | Nettel | Apr. 11, 1950 |

FOREIGN PATENTS

| Number | Country | Date |
|---|---|---|
| 932,801 | France | Dec. 1, 1947 |
| 321,933 | Great Britain | Nov. 19, 1929 |